(12) United States Patent
Schner et al.

(10) Patent No.: US 12,013,839 B1
(45) Date of Patent: *Jun. 18, 2024

(54) GENERATION OF INTELLIGENT INDICATORS FROM DISPARATE SYSTEMS

(71) Applicant: Wells Fargo Bank, N.A., San Francisco, CA (US)

(72) Inventors: Agata T. Schner, Greensboro, NC (US); Sherri L. Claycomb, Highlands Ranch, CO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 885 days.

This patent is subject to a terminal disclaimer.

(21) Appl. No.: 16/949,827

(22) Filed: Nov. 16, 2020

Related U.S. Application Data (63) Continuation of application No. 14/923,975, filed on Oct. 27, 2015, now Pat. No. 10,839,301.

(51) Int. Cl.
*G06F 16/23* (2019.01)
*G06F 16/25* (2019.01)

(52) U.S. Cl.
CPC ........ *G06F 16/2379* (2019.01); *G06F 16/258* (2019.01)

(58) Field of Classification Search
None
See application file for complete search history.

(56) References Cited

U.S. PATENT DOCUMENTS

| | | |
|---|---|---|
| 6,222,535 B1 | 4/2001 | Hurd, II |
| 6,868,413 B1 | 3/2005 | Grindrod et al. |
| 8,135,612 B1 | 3/2012 | Scudder |
| 8,462,922 B2 | 6/2013 | Evans, Jr. et al. |
| 8,799,230 B2 | 8/2014 | Pignataro et al. |
| 10,839,301 B1 | 11/2020 | Schner et al. |
| 2005/0193055 A1 | 9/2005 | Angel et al. |
| 2006/0126801 A1 | 6/2006 | Laperi et al. |
| 2008/0307430 A1 | 12/2008 | Friedlander et al. |
| 2010/0153446 A1 | 6/2010 | Kondziela |
| 2012/0102421 A1 | 4/2012 | Handorf et al. |

(Continued)

FOREIGN PATENT DOCUMENTS

| | | |
|---|---|---|
| WO | WO-2001050375 A1 | 7/2001 |
| WO | WO-2016076878 A1 | 5/2016 |

OTHER PUBLICATIONS

"U.S. Appl. No. 14/923,975, Decision on Pre-Appeal Brief mailed May 21, 2019", 2 pgs.

(Continued)

*Primary Examiner* — Scott A. Waldron
(74) *Attorney, Agent, or Firm* — SCHWEGMAN LUNDBERG & WOESSNER, P.A.

(57) ABSTRACT

Disclosed in some examples, are methods, systems, and machine readable mediums which provide an event processing system and indicator engine that provide indicators to one or more of the channel systems that pertain to a status of an issue experienced by a customer. The indicators are created in part based upon updates to the issue entered into a customer issue system and when displayed in a channel system, the indicators provide an indication that there is an update on the particular issue affecting the customer.

20 Claims, 5 Drawing Sheets

(56) References Cited

U.S. PATENT DOCUMENTS

| | | | |
|---|---|---|---|
| 2013/0013475 A1* | 1/2013 | Marakowitz | G06Q 10/0631 705/35 |
| 2013/0136253 A1 | 5/2013 | Liberman et al. | |
| 2014/0081897 A1 | 3/2014 | Flores et al. | |

OTHER PUBLICATIONS

"U.S. Appl. No. 14/923,975, Examiner Interview Summary mailed Feb. 3, 2020", 3 pgs.

"U.S. Appl. No. 14/923,975, Final Office Action mailed Apr. 30, 2020", 22 pgs.

"U.S. Appl. No. 14/923,975, Final Office Action mailed Dec. 13, 2018", 48 pgs.

"U.S. Appl. No. 14/923,975, Non Final Office Action mailed Apr. 19, 2018", 39 pgs.

"U.S. Appl. No. 14/923,975, Non Final Office Action mailed Nov. 15, 2019", 22 pgs.

"U.S. Appl. No. 14/923,975, Notice of Allowance mailed Jul. 15, 2020", 11 pgs.

"U.S. Appl. No. 14/923,975, Pre-Appeal Brief Request for Review filed May 7, 2019", 5 pgs.

"U.S. Appl. No. 14/923,975, Response filed Feb. 18, 2020 to Non Final Office Action mailed Nov. 15, 2019", 12 pgs.

"U.S. Appl. No. 14/923,975, Response filed Jun. 30, 2020 to Final Office Action mailed Apr. 30, 2020", 12 pgs.

"U.S. Appl. No. 14/923,975, Response filed Aug. 20, 2018 to Non Final Office Action mailed Apr. 19, 2018", 12 pgs.

"U.S. Appl. No. 14/923,975, Response filed Sep. 9, 2019 to Decision on Pre-Appeal Brief mailed May 21, 2019", 17 pgs.

"SmarterTools", SmarterTools Inc., [Online]. Retrieved from the Internet: <URL:http://www.smartertools.com/, (Accessed Aug. 4, 2015), 1 pg.

Ivey, Jay, "Our 10 Favorite Help Desk User Interfaces (UIs)", [Online]. Retrieved from the Internet: <URL: http://csi.softwareadvice.com/10-favorite-help-desk-software-uis-0614/, (Jun. 19, 2014), 8 pgs.

\* cited by examiner

GENERATION OF INTELLIGENT INDICATORS FROM DISPARATE SYSTEMS

CROSS-REFERENCE TO RELATED APPLICATION

This application is a continuation of U.S. patent application Ser. No. 14/923,975, filed Oct. 27, 2015, now U.S. Pat. No. 10,839,301, issued Nov. 17, 2020, which is incorporated by reference herein in its entirety.

TECHNICAL FIELD

Some embodiments pertain to tracking of issues entered into multiple disparate systems. Some embodiments relate to generation of indicators for display in one or more channel systems.

BACKGROUND

As organizations grow larger to meet additional customer needs, the organization may adopt a number of incompatible and distinct systems for meeting these additional needs. This may present challenges when attempting to integrate these systems to solve customer needs or provide customer insights.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An organization may have many different dedicated customer issue systems for handling customer issues. These systems allow customers to open issues and provide a work flow for resolving these issues. Along the way, there may be updates to the status of these issues. These customer issue systems may be separate from the normal systems utilized for administering the products or services offered to the customer. Additionally, these customer issue systems may be specific to the product that the customer is having the problem with. For example, a financial institution may have special systems that handle customer issues with investments, systems that may handle customer issues with commercial banking, and the like. These systems are designed and developed with the aim of delivering maximum customer service to handle issues for their particular focus areas.

While these systems work well for their individualized purposes, they may not necessarily be compatible with each other, Additionally, the systems used to administer the products or services, the various "channel" systems, may not be able to communicate with the customer issue systems, or with themselves. For example, channel systems may be systems used by bank tellers, mortgage brokers, and the like, used by employees to administer the organization's products or services. Additionally, channel systems may be customer facing, such as a web applications and mobile applications used by customers directly to administer their products and/or services.

Thus, an employee of the organization that is servicing the customer through a channel system may not have easy access to information or updates regarding an issue faced by the customer. Because of these incompatibilities, a customer who is experiencing an issue may feel that the organization is not providing appropriate customer service.

Disclosed in some examples, are methods, systems, and machine readable mediums which provide an event processing system and indicator engine that provide indicators to one or more of the channel systems that pertain to a status of an issue experienced by a customer. The indicators are created in part based upon updates to the issue entered into a customer issue system and, when displayed in a channel system, the indicators provide an indication that there is an update on the particular issue affecting the customer. The customer issue systems and channel systems in some examples are separate and distinct systems. Indicators may comprise a data structure describing activity (e.g., an update) on an issue in the customer issue systems and may be displayed in a channel system as one or more graphical cues and one or more textual elements that describe the activity. The indicators, when displayed, may be displayed as textual, graphical or other visual, audio, or audiovisual cues and may contain links (e.g., hyperlinks) to other content, such as a hyperlink to the issue update record, or a record in the customer issue system that generated the issue update record.

Employees utilizing the various channel systems may be alerted by the indicators to the update regarding the customer's issue when administering the various products or services the customer uses. The employees may then update the customer on the status of their issue. In other examples, the customer may be utilizing a channel system directly (e.g., a web interface or a mobile application) and may themselves be alerted to the update via the indicator.

After an issue is created or an open issue is updated in the customer issue systems, an event processing system receives issue update records in real time (or near real time) from the plurality of customer issue systems, Customer issue systems may be systems used by the organization to enter, track, and update customer issues. The issue update records sent by the customer issue systems include information updating the status of an issue and may be in a format specific to the customer issue systems. The event processing system may process the issue update records into a standardized issue update record. The standardized issue update records may comprise a data structure containing information of the issue update records translated into a common format. The event processing system may then store the standardized issue update record.

An indicator engine may then process these standardized issue update records and determine whether to create one or more indicators for a customer. The indicator engine may determine, based upon the customer's characteristics (including behavior characteristics), the issue's characteristics, past indicators, the update characteristics, and context information if an indicator should be generated, and if an indicator is to be generated, which indicator. The channel systems may then display this indicator. In some examples, the indicator is generated based upon a determination that the customer's behavior along with the status of the issue warrants intervention, for example, based upon past observed data, to prevent a negative customer service outcome (e.g., loss of an account, a complaint, and the like).

If the customer is directly accessing a channel system (e.g., an online system or a mobile device system), then the indicator may be displayed to a customer. If the channel system is utilized by an employee of the organization, the employee may inform the customer about the contents of the indicator, Indicators may be displayed in one or more graphical user interfaces of the channel systems.

Figure 1:
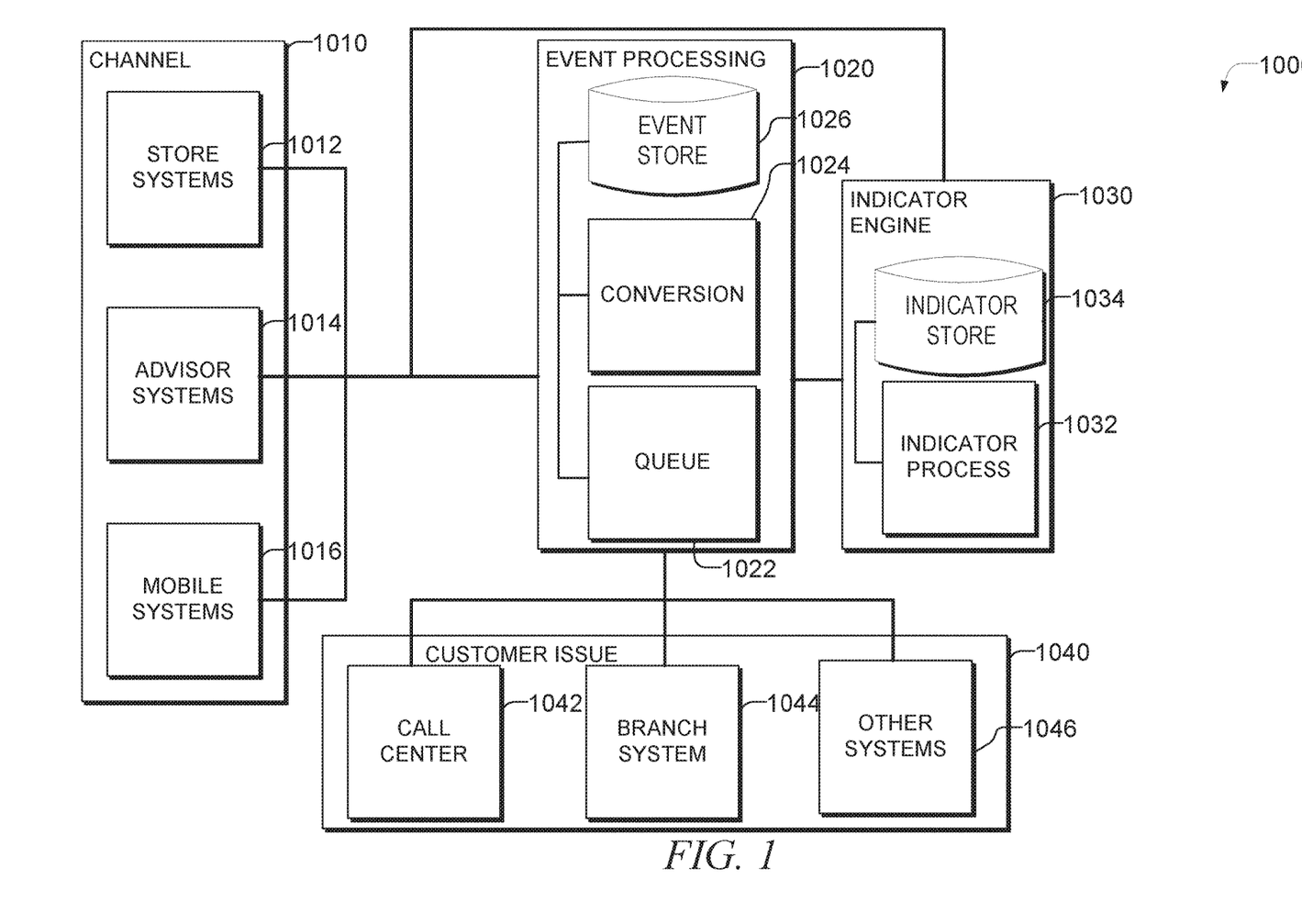
FIG. 1 shows a schematic of an information infrastructure for an organization according to some examples of the present disclosure.

Turning now to FIG. 1, an information infrastructure for an organization is shown 1000 according to some examples of the present disclosure. The system is divided into four main components: the channel systems 1010, event processing systems 1020, indicator engine 1030 and customer issue systems 1040. A customer experiencing an issue may open an issue in one of the customer issue systems 1040. Issues may be opened directly by the customer by accessing one or more graphical user interfaces provided by the customer issue system (e.g., by using a web based or mobile system) or may be accessed indirectly through a customer service agent of the organization. Information about the customer's issue may be input into one or more graphical user interfaces provided by these systems and may be saved on one or more databases provided by these systems.

Example customer issue systems include a call center system 1042 where users may call a telephone number to report issues, a branch system 1044 which may be utilized by one or more branch locations of the organizations, or other customer issue systems 1046 (e.g., an online customer issue system), These systems may create issues, track issues, and update progress on issues. The systems may contact various individuals in the organization and facilitate various process flows with other components of the organization's information infrastructure. The records kept about issues that customers raise in many cases will be specific to the particular system. That is, for example, the records kept about an issue for the branch systems 1044 may not be the same, or even compatible with, the records kept by the call center 1042.

Once a record is created or updated, the customer issue systems, in addition to their own native processing and update flows, may send in real-time (or in near-real-time), an issue update record to the event processing system 1020. In some examples, because of the frequency and volume of these updates, the updates may be queued in queue 1022. These issue updates describe updates to the status of an issue. Issue updates also are sent for newly entered issues.

Conversion process 1024 may pull issue update records from the queue 1022 and may convert the issue update records from the proprietary formats of the customer issue systems into standardized issue updates. The conversion process 1024 may utilize a set of one or more predefined conversion rules for each customer issue system. The conversion rules may specify the translation of certain fields in the issue update record to certain fields or structures in the standardized issue update records in some examples, in performing this task, the event processing system 1020 may contact other components of the organization's information infrastructure. For example, the issue update record may not contain all the necessary information to complete the standardized issue update record. The event processing system 1020 may contact other systems, such as account information systems, the customer issue systems, the channel systems, and the like to complete the standardized issue update record.

In addition to conversion to a standardized issue update records, the conversion process may normalize the records. Normalization may include (but not be limited to) converting date fields to the same time zone, applying a common taxonomy for categorization of issues, validating that customer account information is accurate and consistently represented by the same account data elements (entity id, company id, account number)

Once the issue update records are converted and normalized into standardized issue update records, the standardized issue update records may be stored in an event store 1026. Event store 1026 may comprise one or more databases or other data storage. In some examples, event store 1026 may store a history of updates for multiple users and multiple issues. Issues may be stored in the event store 1026 indexed by customer and/or by issue. Each standardized issue update record may have an expiration date associated with it. When the standardized issue updates are older than their expiration date, they will be deleted from the event store 1026 so as to maintain fresh information about issues of a customer and to free up space from the event store 1026.

Event processing system 1020 may notify the indicator engine 1030 that a new standardized issue update record is available. The indicator engine 1030 and indicator process 1032 may pull one or more standardized issue update records from the event store 1026. In some examples, the indicator engine 1030 may utilize queue 1022. The indicator engine may pull only the new standardized issue update records, but in other examples, it will pull both the newly added standardized issue update records and any other standardized issue update records stored in the event store 1026 for a particular issue, and/or a particular customer.

Indicator process 1032 takes the standardized issue update records processed by the event processing system 1032 and determines whether an indicator should be generated as a result of the standardized issue update records. Indicators may be one or more status updates of one or more issues tracked by one of the customer issue systems. Indicators may be issue indicators that may correspond to one or more issues tracked and entered by the customer issue systems 1040.

The indicator process 1032 may decide not only whether to generate an indicator or not, but what type of indicator and which channel systems are targeted by the indicators. Various different methods may be utilized to calculate whether an indicator should be generated and what type of indicator should be generated, and to which channel systems the indicator should be directed.

The indicator process 1032 may utilize information from the new issue update record (e.g., the type of issue, what the update was, and the like), older issue update records pertaining to the same issue, previous indicators, other issue update records pertaining to the same customer, and customer context data in determining whether to generate an indicator, what type of indicator to generate, and which channels to generate the indicator for. Collectively, the information used by the indicator process 1032 to make these decisions may be termed the decision inputs. The customer context data may include any data that informs the system about the customer, including behavior, preferences, account information (e.g., account balances, statuses, and types of accounts), current circumstances (e.g., current location as determined by a mobile device of the customer,) and the like.

One example method of determining an indicator is the comparison of one or more of the decision inputs to predetermined if-then rules. These rules may specify certain conditions that must be present in the decision inputs and if the conditions are met, that a particular indicator value is to be generated. An example rule might be: "if a field in the decision inputs is X, then notify the channel systems Y of an indicator of type Z," where X, Y, and Z are variable. These predetermined rules may be stored in the indicator store 1034. Example rules may be:
- if the status field on an issue is "open" generate an issue indicator for all channels and set the issue indicator to "attention";
- if the status field on an issue is set to "needs customer action" generate an issue indicator for all channels and set the issue indicator to "immediate attention";
- if the account product type is set to "brokerage", generate an indicator for brokerage channels and set the brokerage issue indicator to "yes".

In some examples, screen space on one or more of the channel systems 1010 may be at a premium and/or customer interaction time may be limited and a customer may qualify for the display of more than one indicator. In order to best serve the customer, the indictor rules may be prioritized, such that if a user meets the requirements to display more than one indicator, the one or more highest ranking indicators are given the highest priority to be displayed before other lower priority indicators. Additionally, the prioritization may be dynamic. For example, once a user is shown a particular indicator, the priority for that indicator may be reduced so that the next time the user is shown an indicator it will be a different indicator. In other examples, priorities may be adjusted over time. For example a low priority indicator that is never acted upon or resolved may have its priority increased over time in order to call attention to the indicator and ensure resolution. In other examples, the priorities may be set by the customer issue systems. For example, the customer support person may input a priority into their system. In yet other examples, recent activity related to the issue may prioritize one indicator over another.

In other examples, rather than if-then statements, the decision inputs may be used as input into a machine-learned model which when evaluated by a processor, outputs one of a predetermined list of indicators. In some examples, the model may be a classification decision tree in which the system classifies the input into one of several groups having a corresponding set of one or more output indicators. Decision trees may be built using algorithms such as Iterative Dichotomiser 3 (ID3), C4.5, Classification and Regression Tree (CART), Chi-squared Automatic Interaction Detector (CHAID), MARS, and the like. In other examples, other techniques may be utilized, such as linear regression, support vector machines, and the like to build a model which describes an affinity between the decision inputs and an indicator. These models all attempt to determine, based upon the decision inputs, whether an indicator is necessary to increase customer satisfaction.

In these machine learning examples, the indicators may be classified not only according to a type of indicator, but also by the channel system they are to be issued to. That is, multiple indicators of the same type may be created—one for each target channel system. For example, separate indicators of type: "customer information needed," may be created for each channel system. So, in FIG. 1, there may separate indicators for the "customer information needed" type for each of the store systems 1012, advisor systems 1014, and mobile systems 1016. The classification and decision tree algorithms may consider these to be different indicators. Thus, the classification and decision tree algorithms may determine not only the type of indicator but the target channels as well.

In the machine learning examples, the models may be built using training examples. The training examples may be decision inputs built from historical data. These examples may be built by manually labelling input vectors where the vector components comprise the information in the decision inputs. These vectors may be labeled as to which indicators to issue, or in some vectors, not to issue an indicator. In some examples, once the initial model is constructed, feedback from users may be utilized to refine the model by including new examples labelled by customer feedback into the training data, and retraining the model. The model is then trained based upon these examples.

As noted, the methods to determine whether and what type of indicator to generate may incorporate customer context information including behavior information in making decisions about whether to create an indicator and in some examples which channels the indicator is to be issued to. For example, the if-then rules may consider customer context and behavior variables. Additionally, the machine learning algorithms may be trained with historical training data that assigns indicators based upon customer outcomes and based upon expert assessments of indicators that should have been issued to improve the customer outcome. For example, training data may be gathered where customers closed accounts due to problems in handling their issues that involved poor communication. The training data may be labeled with desired indicators that would have improved that communication.

The decision inputs to the machine learning algorithms may include the customer's behavior and context information. This may allow the system to determine that the behavior of the customer warrants an indicator to keep the customer happy. The system is then able to tailor indicators in some examples to the particular attributes and states of the customer so as to keep the customer happy. For example, the system may learn that in certain circumstances customers are likely to be very angry. The system may be trained to determine whether customer intervention is necessary to prevent a negative outcome (e.g., a customer that is angry enough to close an account, complain, or otherwise.)

The machine learning model may also be refined based upon information gathered from real outcomes. For example, if an indicator was not issued to a customer experiencing an issue and a poor outcome was observed (e.g., the customer closed an account or complained), the training data may include decision inputs corresponding to the customer's history with the organization and a label indicating when and where the indicator (and what type) should have been issued. This may refine the model such that future situations may improve customer service.

Indicator process 1032 may also calculate one or more values for the indicators. These value may be calculated by one or more predetermined formulas or rules (e.g., if-then based rules) based upon the decision inputs or other information (such as account information), For example, if the number of issues is greater than zero, set the indicator value to a score of 5 where 5 maps to a status of "issue exists and may need review." As another example, if the number of issues corresponding to the customer is greater than zero and the type of issues is set to complaint, set the customer issue indicator score to 10 where 10 is to be interpreted as "issue exists and needs review." As yet another example, if the number of issues corresponding to the customer is greater than zero and the type of issues is set to complaint and the customer action required field on a complaint issue is set to yes, set the customer issue indicator score to 20 where 20 is to be interpreted as "issue exists and needs review."

Indicators, if generated, may be stored in the indicator store 1034. When channel systems 1010 access a customer's information to service the customer, the channel systems 1010 may query the indicator engine 1030 to determine if there are indicators in the indicator store 1034 for this channel system for this customer. The indicator engine 1030 may send a message with the indicator if one exists, or a message indicating that no indicator exists. If an indicator is sent, then the channel systems 1010 may display the indicator either to the customer directly (e.g., the mobile systems 1016), or to a customer service representative in some channel systems (e.g., store systems 1012, or advisor systems 1014).

In other examples, instead of the channel systems 1010 querying the indicator engine 1030 to determine if there are indicators for a customer, the indicator engine 1030 would notify the channel systems 1010 that an indicator is present. The indicators, whether displayed to a customer directly, or displayed to an employee are displayed as part of a graphical user interface presented by the channel systems 1010.

It is to be noted that the infrastructure 1000 is divided into separate systems for ease of understanding, however, functions provided by the various systems may be combined or further subdivided and arranged in many different ways in different combinations of hardware and/or software. For example, the functions of the event processing systems 1020 and indicator engine 1030 may be performed on the same server and/or by the same software or by different software. Indeed, any one or more of the components of FIG. 1 may be performed by the same physical hardware using the same and/or different software.

Figure 2:
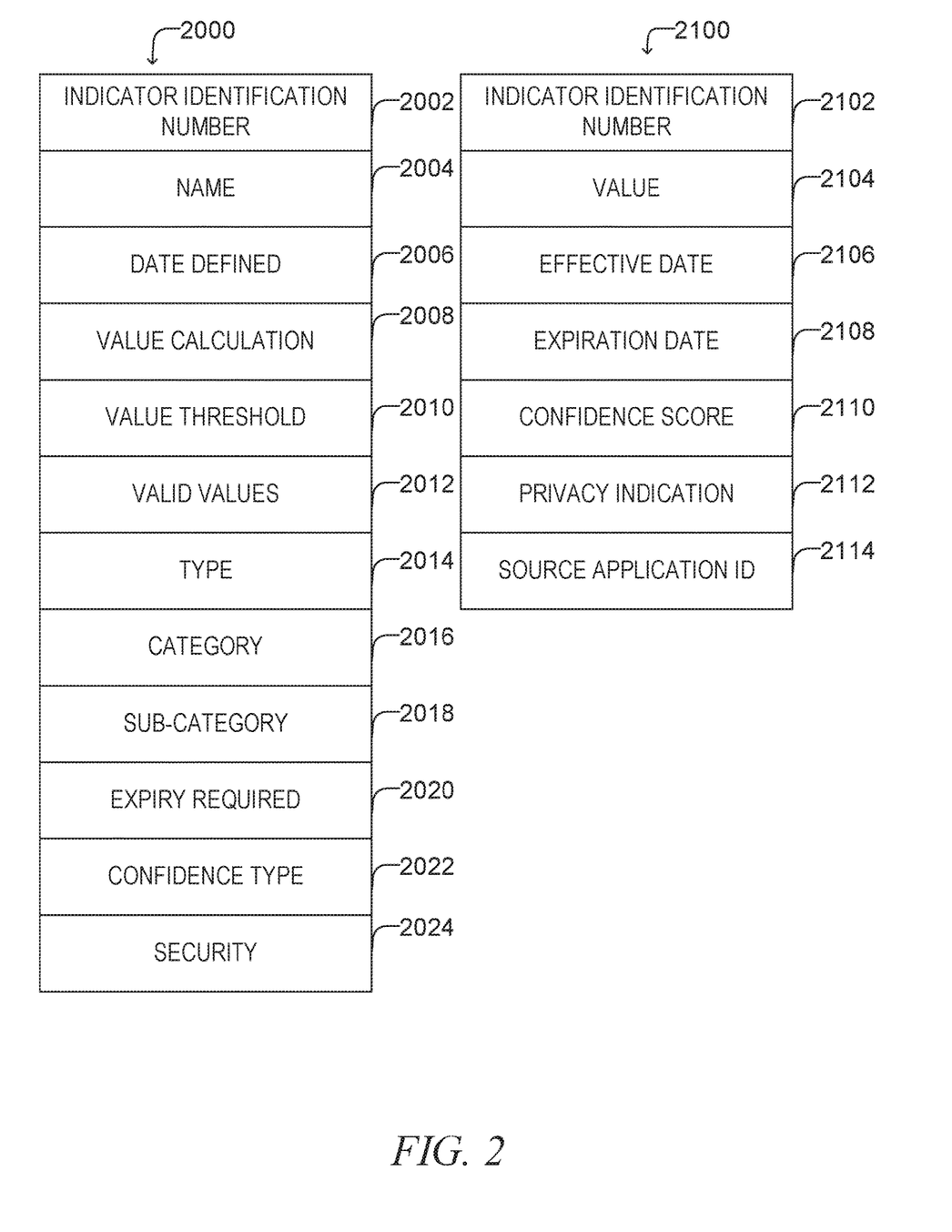
FIG. 2 shows a schematic of an indicator definition data structure and a schematic of an indicator instance data structure according to some examples of the present disclosure.

FIG. 2 shows a schematic of an indicator definition data structure 2000 and a schematic of an indicator instance data structure 2100 according to some examples of the present disclosure. The indicator definition 2000 describes an indicator. An identification number 2002 may uniquely identify an indicator and may be, for example, a number or a textual string. The name 2004 may describe or identify the indicator and may be a string data type. The name 2004 may be what is displayed on the channel system 1010 when displaying the indicator. The date defined field 2006 represents the date that this indicator was defined as an indicator. The value calculation 2008 stores the predetermined function or rules used to calculate the value of the indicator. Value threshold 2010 stores the minimum and maximum values that the indicator can have.

The Valid Values 2012 may store the type of values that can be stored (e.g., alphanumeric, floating point, integer, and the like.) Type 2014 may be a value storing the type of indicator. Category 2016 and sub-category 2018 allow for creating an ontology of indicators for easy sorting, filtering, and reporting. Expiry required 2020 specifies whether the indicator will have an expiry date associated with it, the passing of which, will cause the indicator to be deleted. Confidence type 2022 is a descriptor for a type of confidence score (e.g., a Boolean indicating whether the system is confident of the recommendation, an integer or floating point number representing a confidence % or score, or the like). Security parameters 2024 may specify which indicators are shared with which systems and which individuals will have access to the indicators.

An instance of indicator data structure 2100 is an example of what is created when an indicator is created and describes the indicator. The indicator identification number 2102 may uniquely identify the indicator from all other indicators. The indicator identification may also identify the indicator definition data structure 2000 corresponding to the instance of the indicator. Value 2104 represents the value calculated using the value calculation function or rules 2008. Effective date 2106 is the date the indicator went into effect. In some examples this may be the date the indicator was created. In other examples, it may be a date prior to the indicator creation date, but in other examples, it may be a date in the future in anticipation of a future event. Expiration date 2108 is optional and dependent on the expiry required field 2020 in the corresponding indicator definition data structure 2000. Expiration date 2108 gives a time when the indicator is no longer valid. Confidence score 2110 represents the confidence the system has about whether or not the indicator is appropriate for the customer, given the decision inputs. It may be generated by the use of one or more probability assessments and the calculation of which may be part of the machine learning algorithm described above. Privacy indications 2112 is based upon the security information 2024 in the indicator definition data structure 2000. Source application ID 2114 identifies the customer issue system 1040 that generated the issue update that ultimately triggered the creation of the indicator.

Figure 3:
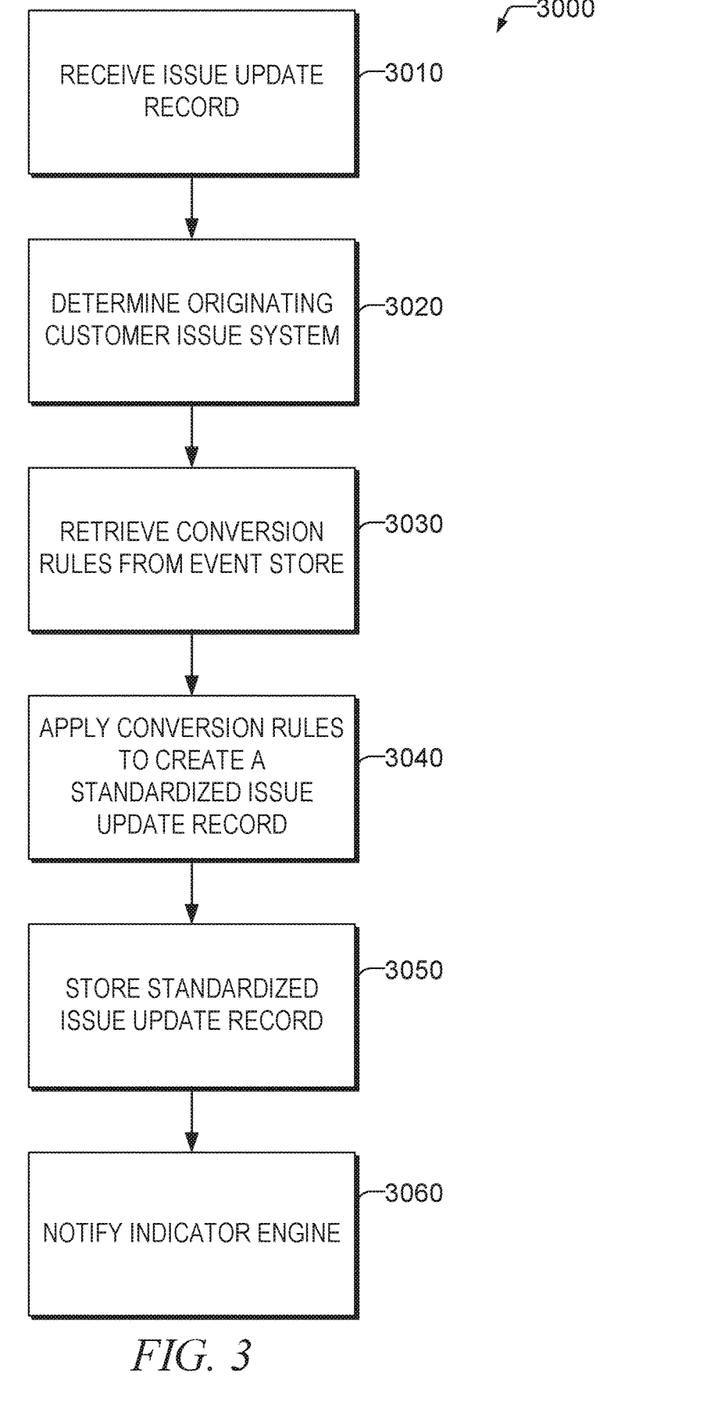
FIG. 3 shows a flowchart of a method of an event processing system according to some examples of the present disclosure.

FIG. 3 shows a flowchart of a method 3000 of an event processing system according to some examples of the present disclosure. At operation 3010 the event processing system (e.g., the event processing system 1020 of FIG. 1) receives an issue update record 3010. The event processing system may periodically check the queue for issue update records and transfer them from the queue into a memory of the event processing system. In other examples, the queue may send a notification to the event processing system periodically for example, when a new issue update record is added or when more than a predetermined number of records are in the queue.

At operation 3020 the event processing system determines the originating customer issue system. For example, the event processing system may determine the originating customer issue system based upon matching the event record to one of a plurality of possible formats. The corresponding customer issue system of the matching one of the plurality of possible formats is the originating customer issue system. In other examples, the issue update record may determine the originating customer system from a header appended before the actual issue update record that describes the source and other information needed to decode the rest of the issue update record. This header may be added by the customer issue system, the queue (based upon the connection it was received over) and the like.

At operation 3030, based upon the originating customer issue system, the event processing system retrieves conversion rules from a database. One example database may be the event store (e.g., event store 1026.) The conversion rules may be stored for each originating customer issue system. The event processing system may query the database using the originating customer issue system using one or more database commands. For example, the conversion rules may be indexed by originating customer issue system determined at operation 3020.

The conversion rules may specify the conversion of one or more fields of the issue update record into one or more fields of a standardized issue update record. At operation 3040 the event processing system converts the issue update record into the standardized issue update record using the conversion rules retrieved from operation 3030. As already noted, the event processing system may contact other relevant systems to complete the standardized issue update records as necessary.

At operation 3050 the standardized issue update records are stored in the event store or other suitable database. This may be done using one or more appropriate database commands. The issue update records may be indexed based upon customer and based upon issue for quick retrieval. At operation 3060, the indicator engine may be notified that a new standardized issue update record was stored.

Figure 4:
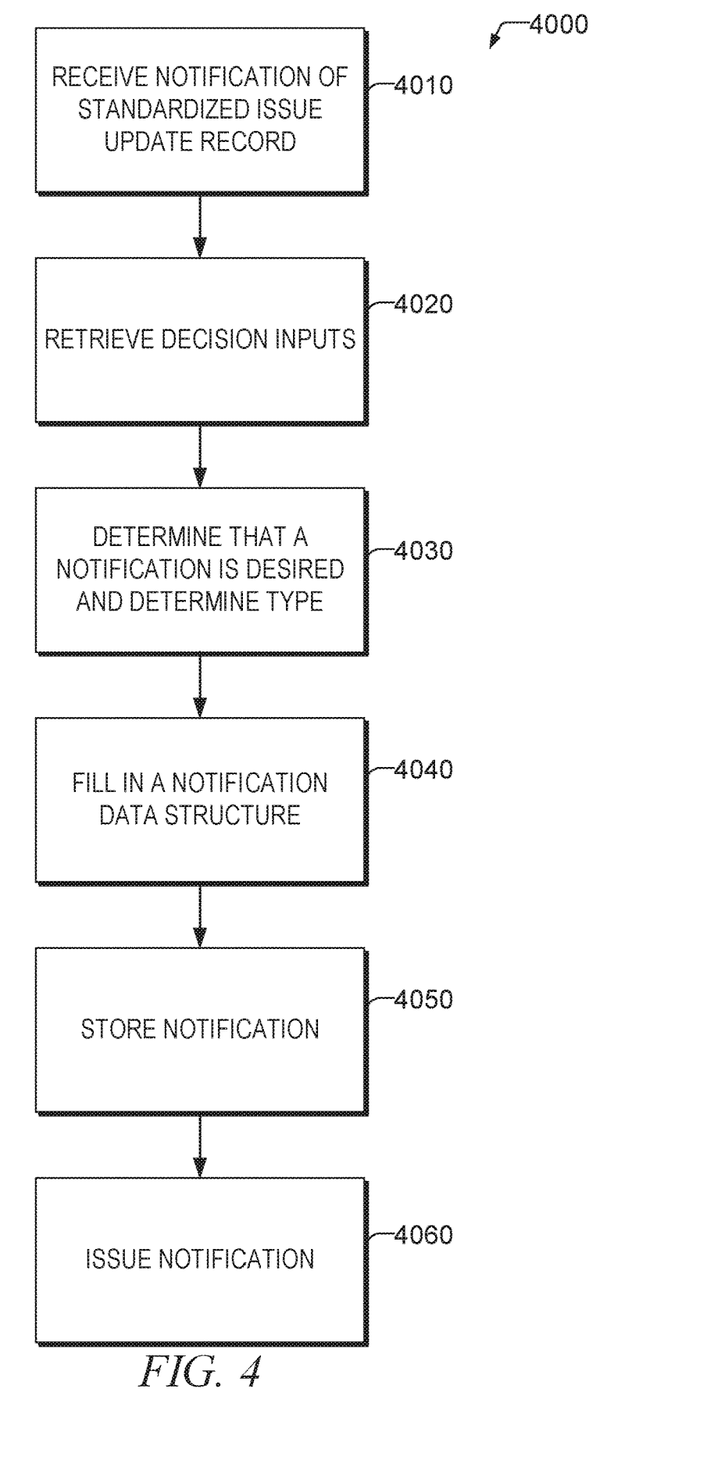
FIG. 4 shows a flowchart of a method of an indicator engine according to some examples of the present disclosure.

FIG. 4 shows a flowchart of a method 4000 of an indicator engine according to some examples of the present disclosure. At operation 4010 the indicator engine receives a notification that the event processing system has stored a new standardized issue update record. In some examples, this is a notification message, in other examples, the event processing system may send the newly stored standardized issue update record to the indicator engine. In other examples, the indicator engine may periodically check the event processing system for new standardized issue update records.

At operation 4020 the indicator engine may retrieve all decision inputs. Decision inputs include one or more of: information from the new issue update record (e.g., the type of issue, what the update was, and the like), older issue update records pertaining to the same issue, previous indicators, other issue update records pertaining to the same customer, and customer context data. The customer context data may include any data that informs the system about the customer, including preferences, account information (e.g., account balances, statuses, and types of accounts), current circumstances (e.g., current location as determined by a mobile device of the customer,) and the like. The decision inputs may be retrieved from the event store, the indicator store 1034, one of the customer issue systems 1040 or another suitable database. The decision inputs may be stored in one or more databases that are indexed by customer and/or issue.

At operation 4030 the indicator engine determines that a notification is desired and determines the type of notification and in some examples, the channel systems that the notification is issued to. As previously explained, the indicator engine may utilize one or more if-then rules, machine learned decision trees, logistic regression, and other machine learned models to make this determination.

At operation 4040, when it is determined that a notification is to be issued, the indicator engine may retrieve the indicator definition (e.g., 2000) to fill in a data structure describing the indicator (e.g., 2100). The indicator definition is used to populate the data structure describing the indicator. Once populated, the data structure describing the indicator may be stored at operation 4050, for example, in the indicator store 1034 or another suitable database.

At operation 4060, the notification is issued to one or more channel systems. Notifications may be issued by indicator engine sending a notification to one or more target channel systems. In other examples, the indicators may be issued by storing a flag along with customer information that notifies the channel systems that an indicator is present and that the channel system should request the indicator information from the indicator engine. In still other examples, the channel systems query the indicator engine every time they pull up a customer file to determine if there is an indicator for the customer's file.

Figure 5:
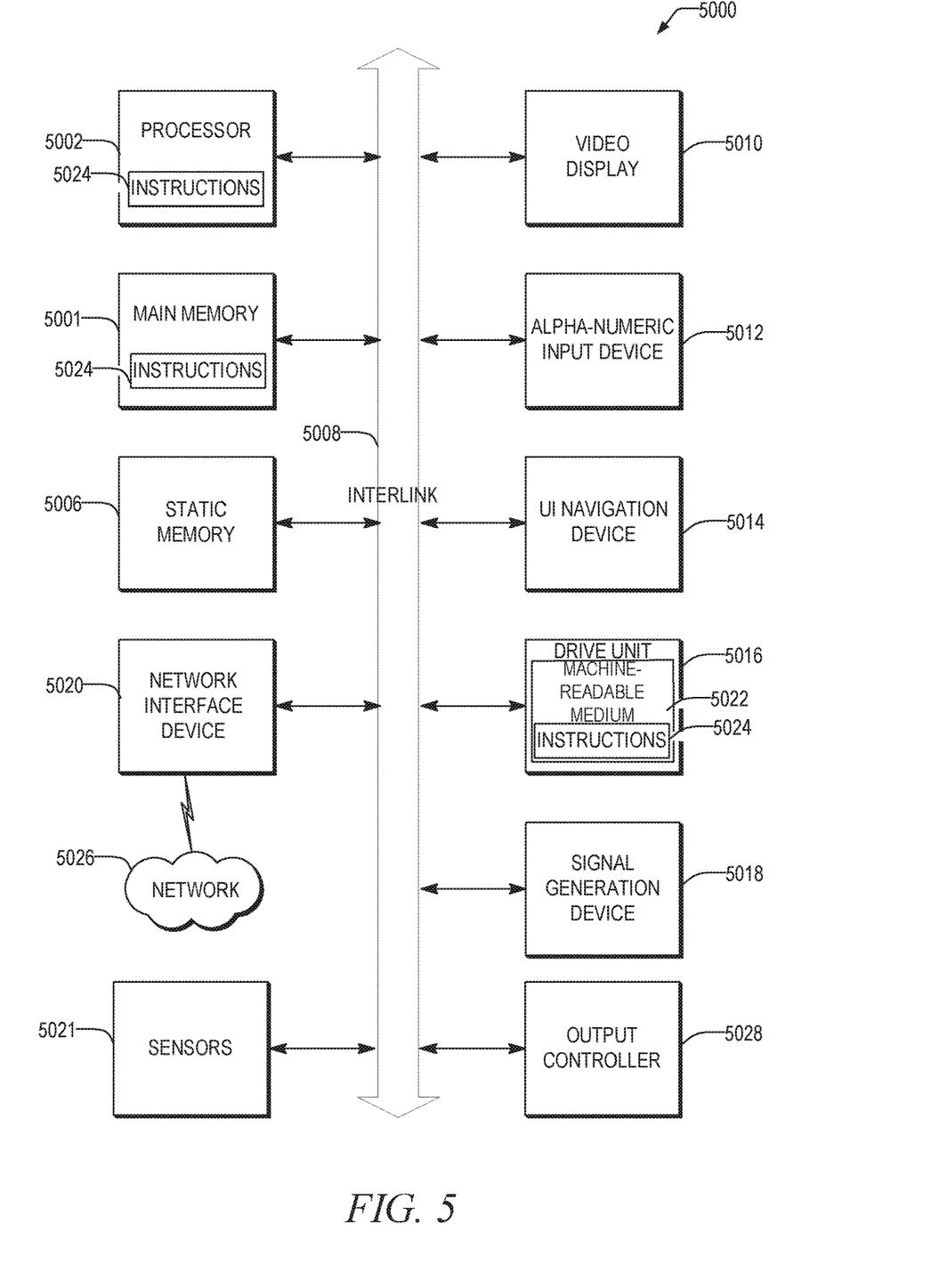
FIG. 5 is a block diagram illustrating an example of a machine upon which one or more embodiments may be implemented.

While the disclosure focused on issue indicators, in some examples, indicators may also be business indicators, sales indicators, preference indicators, and credit indicators. Business indicators may be used to inform internal business processes of the status of a particular activity. Business indicators may be made available across different business processes to inform the ecosystem and allow a variety of responses depending on the status of a particular activity. Sales Indicators: indicators specific to the sale processes. Sales indicators may be used to determine viability and/or priority of presentation of a particular product/offer to the customer during a sales cycle. Preference indicators: indicators specific to self reported customer preferences for a variety of dimensions including contact, communication method, language. Preference indicators may be used to inform and optimize the customer sales and servicing processes. Credit Indicators: indicators specific to the credit qualification processes. May be used by marketing and sales to calibrate offer presentment, referral and underwriting practices. The if-then-rules and machine learning algorithms described above may be modified to also generate these other types of indicators from a variety of data sources including data from the channel systems, customer issue systems, and the like, FIG. 5 illustrates a block diagram of an example machine 5000 upon which any one or more of the techniques (e.g., methodologies) discussed herein may be performed. In alternative embodiments, the machine 5000 may operate as a standalone device or may be connected (e.g., networked) to other machines. Machine 5000 may execute or be a part of channel systems 1010, event processing systems 1020, indicator engine 1030, and/or customer issue systems 1040. In a networked deployment, the machine 5000 may operate in the capacity of a server machine, a client machine, or both in server-client network environments. In an example, the machine 5000 may act as a peer machine in peer-to-peer (P2P) (or other distributed) network environment. The machine 5000 may be a server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 5000 may include a hardware processor 5002 (e.g., a central processing unit (CPU), a graphics processing unit (GPU), a hardware processor core, or any combination thereof), a main memory 5004 and a static memory 5006, some or all of which may communicate with each other via an interlink (e.g., bus) 5008. The machine 5000 may further include a display unit 5010, an alphanumeric input device 5012 (e.g., a keyboard), and a user interface (UI) navigation device 5014 (e.g., a mouse). In an example, the display unit 5010, input device 5012 and UI navigation device 5014 may be a touch screen display. The machine 5000 may additionally include a storage device (e.g., drive unit) 5016, a signal generation device 5018 (e.g., a speaker), a network interface device 5020, and one or more sensors 5021, such as a global positioning system (GPS) sensor, compass, accelerometer, or other sensor. The machine 5000 may include an output controller 5028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 5016 may include a machine readable medium 5022 on which is stored one or more sets of data structures or instructions 5024 (e.g., software) embodying or utilized by any one or more of the techniques or functions described herein. The instructions 5024 may also reside, completely or at least partially, within the main memory 5004, within static memory 5006, or within the hardware processor 5002 during execution thereof by the machine 5000. In an example, one or any combination of the hardware processor 5002, the main memory 5004, the static memory 5006, or the storage device 5016 may constitute machine readable media.

While the machine readable medium 5022 is illustrated as a single medium, the term "machine readable medium" may include a single medium or multiple media (e.g., a centralized or distributed database, and/or associated caches and servers) configured to store the one or more instructions 5024.

The term "machine readable medium" may include any medium that is capable of storing, encoding, or carrying instructions for execution by the machine 5000 and that cause the machine 5000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks, in some examples, machine readable media may include non-transitory machine readable media. In some examples, machine readable media may include machine readable media that is not a transitory propagating signal.

The instructions 5024 may further be transmitted or received over a communications network 5026 using a transmission medium via the network interface device 5020. The Machine 5000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 5020 may include one or more physical jacks (e.g., Ethernet, coaxial, or phone jacks) or one or more antennas to connect to the communications network 5026. In an example, the network interface device 5020 may include a plurality of antennas to wirelessly communicate using at least one of single-input multiple-output (SIMO), multiple-input multiple-output (MIMO), or multiple-input single-output (MISO) techniques. In some examples, the network interface device 5020 may wirelessly communicate using Multiple User MIMO techniques.

What is claimed is:

1. A method comprising:

receiving, by one or more processors of an event processing system, over a packet-based network, an issue update record data structure from a first one of a plurality of disparate customer issue systems, each disparate customer issue system specific to a distinct product, the issue update record data structure in a first format specific to the first one of the plurality of disparate customer issue systems and different than a second format specific to a second one of the plurality of disparate customer issue systems, the issue update record data structure describing an update to a previously entered issue of a customer, the previously entered issue experienced with the distinct product corresponding to the disparate customer issue system at which the previously entered issue was entered;

converting, by the one or more processors of the event processing system, the issue update record data structure to a standardized issue update record data structure by applying a standardization rule to the issue update record data structure;

storing, by the one or more processors of the event processing system, the standardized issue update record data structure in a database;

automatically determining, by an indicator engine, whether to create a new indicator based upon the standardized issue update record data structure and a previous indicator created by the indicator engine for the previously entered issue;

responsive to determining that the new indicator is to be created:
- selecting, by the indicator system engine, one of a plurality of disparate channel systems to display the new indicator, the plurality of disparate channel systems distinct from the plurality of disparate customer issue systems, the new indicator providing a status update for the previously entered issue; and
- sending, over the packet-based network to the one of the plurality of disparate channel systems selected by the indicator engine, a message causing the new indicator to be displayed as part of a graphical user interface of the one of the plurality of disparate channel systems.

2. The method of claim 1, wherein automatically determining, by the indicator engine, whether to create the new indicator based upon the standardized issue update record data structure and the previous indicator created by the indicator engine for the previously entered issue comprises applying an if-then rule to a field of the standardized issue update record data structure.

3. The method of claim 1, further comprising:
- training a machine learning model using a machine learning method and past standardized issue update record data structures labelled with an indication of whether a new indicator was created; and
- wherein determining that the new indicator is to be created comprises applying the standardized issue update record data structure and previous indicator as inputs into the machine learning model.

4. The method of claim 3, wherein the machine learning model comprises one of a decision tree, a classification method, linear regression, or support vector machines.

5. The method of claim 1, wherein determining that the new indicator is to be created comprises determining that the new indicator is to be created based upon the standardized issue update record data structure, the previous indicator created by the indicator engine for the previously entered issue, and a determination that a behavior of the customer indicates a negative customer service outcome.

6. The method of claim 1, wherein the one of the plurality of disparate channel systems selected by the indicator engine is a system accessible by the customer and wherein the new indicator is displayed to the customer.

7. The method of claim 1, wherein the disparate customer issue system is one of: a call center system, a branch system, or an online customer issue system.

8. The method of claim 1, wherein converting, by the one or more processors of the event processing system, the issue update record data structure to the standardized issue update record data structure by applying the standardization rule to the issue update record data structure comprises:
- contacting an account information system for financial account information of the customer; and
- updating the standardized issue update record data structure with the financial account information.

9. The method of claim 1, wherein sending the message, over the packet-based network to the one of the plurality of disparate channel systems selected by the indicator engine, the message causing the new indicator to be displayed as part of the graphical user interface of the one of the plurality of disparate channel system comprises:
- determining that screen space for the one of the plurality of the disparate channel systems selected by the one or more processors is not sufficient to display the new indicator and at least one other indicator to be displayed; and
- responsive to determining that the screen space for the one of the plurality of disparate channel systems selected by the one or more processors is not sufficient to display the new indicator and the at least one other indicator to be displayed, determining that the new indicator has a higher priority than the at least one other indicator; and
- responsive to determining that the new indicator has a higher priority than the at least one other indicator, sending the message.

10. The method of claim 1, wherein the new indicator is an indicator that additional customer information is needed.

11. An event processing system comprising:
- one or more processors;
- a memory, the memory storing instructions, which when executed by the one or more processors, causes the event processing computing system to perform operations comprising:
- receiving, over a packet-based network, an issue update record data structure from a first one of a plurality of disparate customer issue systems, each disparate customer issue system specific to a distinct product, the issue update record data structure in a first format specific to the first one of the plurality of disparate customer issue systems and different than a second format specific to a second one of the plurality of disparate customer issue systems, the issue update record data structure describing an update to a previously entered issue of a customer, the previously entered issue experienced with the distinct product corresponding to the disparate customer issue system at which the previously entered issue was entered;
- converting the issue update record data structure to a standardized issue update record data structure by applying a standardization rule to the issue update record data structure;
- storing the standardized issue update record data structure in a database;
- automatically determining whether to create a new indicator based upon the standardized issue update record data structure and a previous indicator created by the indicator engine for the previously entered issue;
- responsive to determining that the new indicator is to be created:
  - selecting one of a plurality of disparate channel systems to display the new indicator, the plurality of disparate channel systems distinct from the plurality of disparate customer issue systems, the new indicator providing a status update for the previously entered issue; and
  - sending, over the packet-based network to the one of the plurality of disparate channel systems, a message causing the new indicator to be displayed as part of a graphical user interface of the one of the plurality of disparate channel systems.

12. The event processing system of claim 11, wherein the operations of automatically determining, by the indicator engine, whether to create the new indicator based upon the standardized issue update record data structure and the previous indicator created by the indicator engine for the previously entered issue comprises applying an if-then rule to a field of the standardized issue update record data structure.

13. The event processing system of claim 11, further comprising:
    training a machine learning model using a machine learning method and past standardized issue update record data structures labelled with an indication of whether a new indicator was created; and
    wherein determining that the new indicator is to be created comprises applying the standardized issue update record data structure and previous indicator as inputs into the machine learning model.

14. The event processing system of claim 11, wherein the operations of determining that the new indicator is to be created comprises determining that the new indicator is to be created based upon the standardized issue update record data structure, the previous indicator created by the indicator engine for the previously entered issue, and a determination that a behavior of the customer indicates a negative customer service outcome.

15. The event processing system of claim 11, wherein the operations of sending, over the packet-based network to the one of the plurality of disparate channel systems selected by the indicator engine, the message causing the new indicator to be displayed as part of the graphical user interface of the one of the plurality of disparate channel system comprise:
    determining that screen space for the one of the plurality of the disparate channel systems selected by the one or more processors is not sufficient to display the new indicator and at least one other indicator to be displayed; and
    responsive to determining that the screen space for the one of the plurality of disparate channel systems selected by the one or more processors is not sufficient to display the new indicator and the at least one other indicator to be displayed, determining that the new indicator has a higher priority than the at least one other indicator; and
    responsive to determining that the new indicator has a higher priority than the at least one other indicator, sending the message.

16. A non-transitory machine-readable medium, storing instructions, which when executed by a processor of an event processing system, cause the event processing system to perform operations comprising:
    receiving, over a packet-based network, an issue update record data structure from a first one of a plurality of disparate customer issue systems, each disparate customer issue system specific to a distinct product, the issue update record data structure in a first format specific to the first one of the plurality of disparate customer issue systems and different than a second format specific to a second one of the plurality of disparate customer issue systems, the issue update record data structure describing an update to a previously entered issue of a customer, the previously entered issue experienced with the distinct product corresponding to the disparate customer issue system at which the previously entered issue was entered;
    converting the issue update record data structure to a standardized issue update record data structure by applying a standardization rule to the issue update record data structure;
    storing the standardized issue update record data structure in a database;
    automatically determining whether to create a new indicator based upon the standardized issue update record data structure and a previous indicator created by the indicator engine for the previously entered issue;
    responsive to determining that the new indicator is to be created:
        selecting one of a plurality of disparate channel systems to display the new indicator, the plurality of disparate channel systems distinct from the plurality of disparate customer issue systems, the new indicator providing a status update for the previously entered issue; and
        sending, over the packet-based network to the one of the plurality of disparate channel systems, a message causing the new indicator to be displayed as part of a graphical user interface of the one of the plurality of disparate channel systems.

17. The non-transitory machine-readable medium of claim 16, wherein the operations of automatically determining, by the indicator engine, whether to create the new indicator based upon the standardized issue update record data structure and the previous indicator created by the indicator engine for the previously entered issue comprises applying an if-then rule to a field of the standardized issue update record data structure.

18. The non-transitory machine-readable medium of claim 16, further comprising:
    training a machine learning model using a machine learning method and past standardized issue update record data structures labelled with an indication of whether a new indicator was created; and
    wherein determining that the new indicator is to be created comprises applying the standardized issue update record data structure and previous indicator as inputs into the machine learning model.

19. The non-transitory machine-readable medium of claim 16, wherein the operations of determining that the new indicator is to be created comprises determining that the new indicator is to be created based upon the standardized issue update record data structure, the previous indicator created by the indicator engine for the previously entered issue, and a determination that a behavior of the customer indicates a negative customer service outcome.

20. The non-transitory machine-readable medium of claim 16, wherein the operations of sending, over the packet-based network to the one of the plurality of disparate channel systems selected by the indicator engine, the message causing the new indicator to be displayed as part of the graphical user interface of the one of the plurality of disparate channel system comprise:
    determining that screen space for the one of the plurality of the disparate channel systems selected by the one or more processors is not sufficient to display the new indicator and at least one other indicator to be displayed; and
    responsive to determining that the screen space for the one of the plurality of disparate channel systems selected by the one or more processors is not sufficient to display the new indicator and the at least one other indicator to be displayed, determining that the new indicator has a higher priority than the at least one other indicator; and
    responsive to determining that the new indicator has a higher priority than the at least one other indicator, sending the message.

* * * * *

UNITED STATES PATENT AND TRADEMARK OFFICE
CERTIFICATE OF CORRECTION

| | |
|---|---|
| PATENT NO. | : 12,013,839 B1 |
| APPLICATION NO. | : 16/949827 |
| DATED | : June 18, 2024 |
| INVENTOR(S) | : Schner et al. |

It is certified that error appears in the above-identified patent and that said Letters Patent is hereby corrected as shown below:

In the Claims

In Column 13, Line 11, in Claim 1, after "indicator", delete "system"

In Column 14, Line 25, in Claim 11, after "processing", delete "computing"

Signed and Sealed this
Seventeenth Day of September, 2024

Katherine Kelly Vidal
*Director of the United States Patent and Trademark Office*